United States Patent [19]
Frost

[11] Patent Number: 5,232,983
[45] Date of Patent: Aug. 3, 1993

[54] ACRYLATE OR METHACRYLATE COATING COMPOSITIONS COMPRISING WAX

[75] Inventor: George W. Frost, Woodbury, Minn.

[73] Assignee: Minnesota Mining and Manufacturing Company, St. Paul, Minn.

[21] Appl. No.: 713,717

[22] Filed: Jun. 11, 1991

[51] Int. Cl.$^5$ .............................. C08K 5/04
[52] U.S. Cl. ................... 524/763; 524/275; 524/277
[58] Field of Search ............. 524/277, 763, 275

[56] References Cited

U.S. PATENT DOCUMENTS

| | | | |
|---|---|---|---|
| 3,203,921 | 8/1965 | Rosenfelder | 260/33.6 |
| 4,263,372 | 4/1981 | Emmons et al. | 428/446 |
| 4,341,673 | 7/1982 | Hyde | 524/272 |
| 4,640,938 | 2/1987 | Romer et al. | 524/763 X |
| 4,659,641 | 4/1987 | Mahalek et al. | 524/763 X |
| 4,910,080 | 3/1990 | Frost | 428/307.3 |
| 4,990,561 | 2/1991 | Yoshioka | 524/763 |
| 5,034,454 | 7/1991 | Maska et al. | 524/763 |

FOREIGN PATENT DOCUMENTS

| | | |
|---|---|---|
| 0067690 | 12/1982 | European Pat. Off. |
| 0092401 | 10/1983 | European Pat. Off. |
| 0143903 | 6/1985 | European Pat. Off. |
| 0328323 | 8/1989 | European Pat. Off. |
| 0421567 | 4/1991 | European Pat. Off. |
| 0223810 | 11/1985 | Japan ............. 524/763 |
| 0732280 | 5/1980 | U.S.S.R. ............. 524/763 |
| 0420560 | 12/1934 | United Kingdom ......... 524/763 |

Primary Examiner—Joseph L. Schofer
Assistant Examiner—Jeffrey T. Smith
Attorney, Agent, or Firm—Gary L. Griswold; Walter N. Kirn; Dale A. Bjorkman

[57] ABSTRACT

Acrylate or methacrylate compositions are provided for coating porous surfaces, wherein the composition comprises
  a) 90–99.9% acrylate and/or methacrylate monomers, and
  b) 0.1 to 5 percent wax.

The wax in these compositions is soluble in the acrylate and/or methacrylate monomers when the monomers are in a liquid state. The wax is incompatible with a cured coating formed from the polymerization of the acrylate and/or methacrylate monomers.

The compositions cure to provide a non-tacky surface in excellent short time periods as compared to prior similarly constituted acrylate or methacrylate compositions.

16 Claims, 1 Drawing Sheet

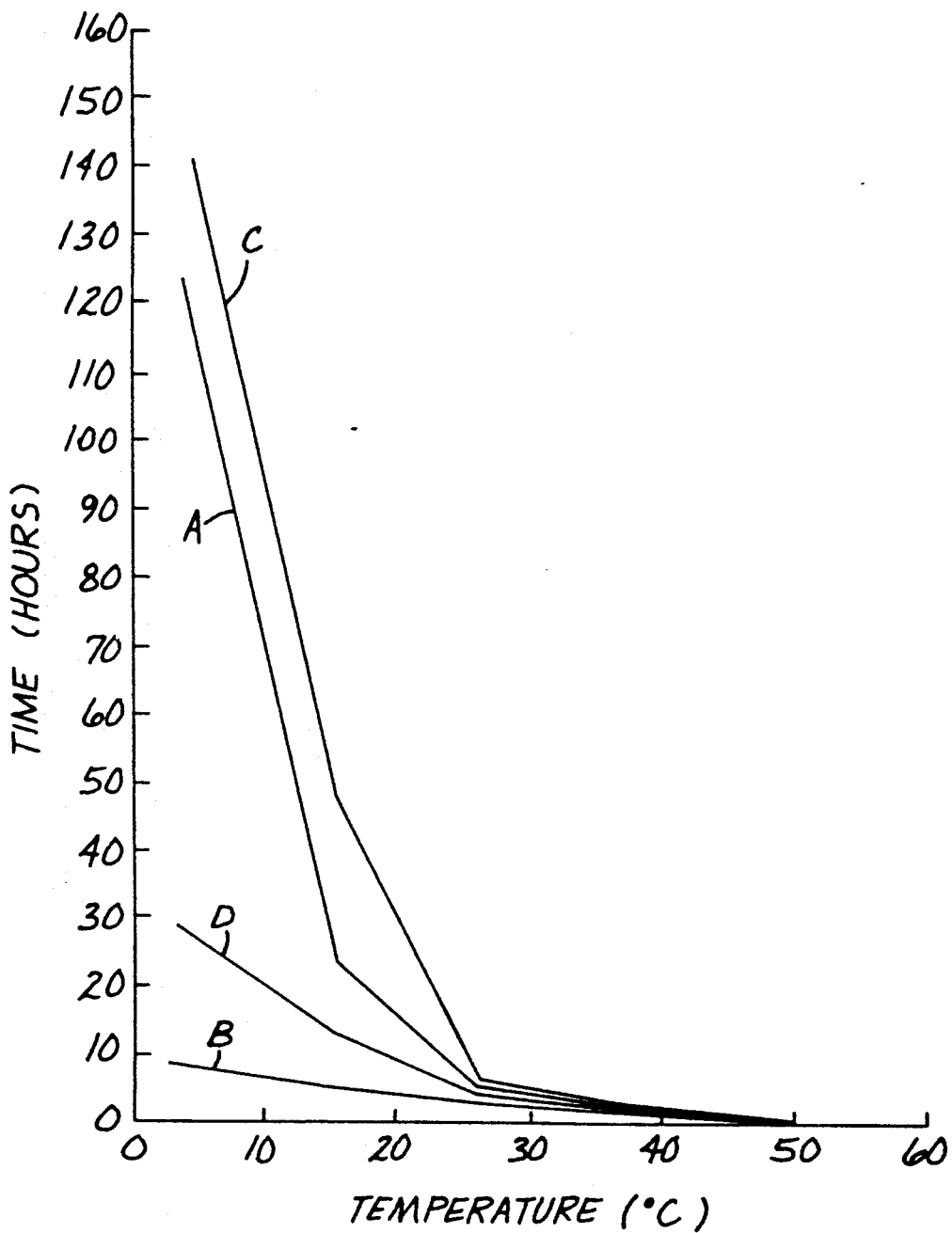

ACRYLATE OR METHACRYLATE COATING COMPOSITIONS COMPRISING WAX

FIELD OF THE INVENTION

This invention relates to impregnating compositions and methods of use thereof for coating porous surfaces.

BACKGROUND OF THE INVENTION

Structures made from portland cement concrete, especially bridge decks, prematurely deteriorate due to wear from exposure to traffic, severe weather conditions and improper application of the concrete or errors in engineering. These structures develop cracks that compromise the integrity of the concrete and expose the reinforcing bars to corrosive elements. Additionally, after a few freeze/thaw cycles, cracks develop into holes that require repair. Many strategies have been employed in an attempt to protect and repair these structures, including providing a protective latex modified concrete overlay, epoxy coating the reinforcing steel, providing an asphaltic concrete/membrane system and feeding a low viscosity, low modulus polymer into the cracks in concrete decks.

One system used to protect portland cement concrete structures is an application of acrylate or methacrylate monomers that cures to form a hard and durable coating on/in concrete.

U.S. Pat. No. 4,341,673 to Hyde relates to methacrylate polymer concrete compositions wherein the tendency of polymer concrete to shrink during cure is reduced by incorporating 5-12% by weight of a paraffinic oil containing at least 60% of saturated aliphatic hydrocarbons and 4-10% by weight of a liquid mixture of an acrylic polymer. This patent teaches that both of these components are needed to achieve the desired properties of the polymer concrete.

U.S. Pat. No. 3,203,921 to Rosenfelder discloses resin compositions of monoolefin polymers, a predominantly aliphatic, paraffinic hydrocarbon mineral oil and mineral filler. The monoolefin may be copolymerized with acrylate polymers. The paraffinic mineral oil reduces the brittleness of these compositions, in addition to gloss and waxy appearance of the ultimate articles prepared therefrom.

U.S. Pat. No. 4,910,080 to Frost discloses impregnating compositions for porous substrates comprising dicyclopentenyl acrylate or methacrylate together with a $C_5$ to $C_8$ alkyl ester of acrylic or methacrylic acid.

U.S. Pat. No. 4,263,372 to Emmons et al. discloses coating compositions for porous substances comprising dicyclopentenyl acrylate or methacrylate, together with a non-volatile acrylate or methacrylate. At col. 4, lines 3-16, enhancement of the cure rate by providing a subsequent application of an immiscible liquid surface coating to block exposure to air is disclosed.

Coating compositions that have been previously used suffer from the disadvantage of requiring a long period of time to cure. This is especially troublesome when the structure to be treated is an integral component to a community transportation system, such as a bridge. When the coating system takes longer than about six hours to cure, traffic may have to be diverted during the "rush hours." Acrylate and methacrylate compositions particularly exhibit long cure times when the ambient temperature goes below about 20° C., or in dark environments such as lower decks in multiple level structures or at night or on cloudy days. There is a need for acrylate or methacrylate coating compositions that will cure to a non-tacky state in a relatively short time, for example less than about 8 hours, even under less than ideal conditions.

SUMMARY OF THE INVENTION

Acrylate or methacrylate compositions are provided for coating porous surfaces, wherein said composition comprises a) 90-99.9% acrylate and/or methacrylate monomers, and b) 0.1 to 5 percent wax.

The wax in these compositions is soluble in the acrylate and/or methacrylate monomers when the monomers are in a liquid state. The wax is incompatible with a cured coating formed from the polymerization of the acrylate and/or methacrylate monomers.

The compositions as provided herein cure to provide a non-tacky surface in excellent short time periods as compared to prior similarly constituted acrylate or methacrylate compositions. This shorter cure time is particularly noted in colder ambient temperatures, such as are experienced at nighttime and in the spring and fall seasons. This shorter cure time is significantly beneficial because it provides additional and more convenient times to apply acrylate and methacrylate coatings. Thus, while before it was necessary to coat bridge decks and the like on warm days, coatings may now be applied on cooler days and even at night with substantially reduced impact on motorists and others who would use the surface to be coated.

Unless otherwise stated, all ratios and percentages disclosed herein are by weight.

BRIEF DESCRIPTION OF THE DRAWING

FIG. 1 is a graph showing the time/temperature curve for coating compositions with and without paraffin wax.

DETAILED DESCRIPTION OF THE PRESENTLY PREFERRED EMBODIMENTS

The basic impregnating composition utilized in the present invention comprises acrylate or methacrylate monomers or blends thereof comprising acrylate or methacrylate components thereof. These acrylates, when mixed with a free radical initiator and optionally with a metal reaction accelerator, may be applied to a porous surface where it cures in situ to provide an excellent protective coating. The porous surface is preferably a structure made from portland cement concrete. Most preferably, the composition of the present invention is applied to weathered and cracked portland cement concrete to restore strength by reconsolidating the concrete and reducing the permeation of gas and liquids through the surface of the porous material. When applied to cracked concrete, the composition of the present invention fills the cracks and chemically cures to form a bond in the concrete. The monomer composition of the present invention preferably comprises at least one acrylate or methacrylate monomer component having a molecular weight of greater than about 200 grams per mole. This heavier monomer preferably is selected from dicyclopentenyl acrylate, dicyclopentenyl methacrylate, dicyclopentenyl oxyethyl methacrylate, dicyclopentenyl oxyethyl acrylate, isobornyl acrylate or isobornyl methacrylate. Preferably, this heavier monomer is present in the composition in about 45-95% by weight based on total monomer weight.

An additional monomer component may be selected from alkyl esters of acrylic or methacrylic acid, or mixtures thereof. Preferably, the esters of acrylic or methacrylic acid are selected from $C_5$ to $C_8$ alkyl esters. These monomers are preferably present in about 5-50% by weight based on total monomer weight. These monomers tend to provide a "flexible" component to the ultimate copolymer.

Dicyclopentenyl acrylate and dicyclopentenyl methacrylate are commonly referred to by the abbreviations DCPA and DCPMA, respectively, or generically as DCP(M)A. These monomers have the structural formula:

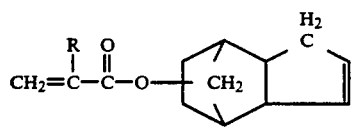

wherein R is —H or —$CH_3$. The methacryloxy substituent may be on either the 5 or 6 position. These compounds may also be called $3a,4,5,6,7,7a$-hexahydro-4,7-methanoindenyl acrylate-5(or 6) or methacrylate-5(or 6).

Examples of suitable acrylic acid or methacrylic acid esters for use as the "flexible" monomer component of the composition include the esters of acrylic acid or methacrylic acid with alcohols such as 1-pentenol, 2-pentenol, 3-pentenol, 2-methanol-1-butanol, 3-heptanol, 1-octanol, 2-octanol, iso-octyl alcohol, 2-ethyl-1-hexanol and the like, or mixtures thereof. Preferably, the flexible monomer component is a $C_8$ alcohol of acrylic acid, and is most preferably iso-octyl acrylate.

It will be appreciated that some premature reaction of monomers may occur, forming oligomers or even short polymers. Such multiple unit species are appropriately contained in the monomer composition provided that they are not present in significant quantities, thereby increasing viscosity and impairing penetration of the composition into the porous substrate.

The composition as described above is mixed with a free radical initiator and preferably with a metal reaction accelerator and is applied to a porous surface, where it impregnates the surface and cures in situ to form a coating on/in concrete.

The free radical initiator that may be used in the composition of this invention is any polymerization agent that will furnish free radicals under polymerization conditions. The initiator is used in an amount effective to produce complete polymerization of the monomer composition at 25° C. ambient temperature within at least about 24 hours. Preferably, the free radical initiator is present in an amount that is about 0.05 to 5 weight percent based on total monomer weight. Particularly preferred catalysts are organic peroxy compounds such as benzoyl peroxide and cumene hydroperoxide. The free radical initiator may be a photoinitiator, which is an agent that is sensitive to ultraviolet light as would be provided in sunlight or in UV lamps. Examples of such a photoinitiator are acetophenones, such as 2,2-dimethoxy-2-phenylacetophenone (commercially available as Irgacure 651 from Ciba-Geigy Corp., Hawthorne, NY) and diethoxyacetophenone; benzil; and benzoin ethers.

The impregnating composition may be initiated by mixtures of two or more different free radical initiators. For example, both an organic peroxy compound and a photoinitiator may be utilized to provide a rapid cure with particularly rapid cure of the outermost layer of the coating from exposure to light.

A metal reaction accelerator is incorporated in the composition in an amount effective to enhance speed and completeness of cure of the impregnating composition. Thus, when only a photoinitiated free radical initiator is utilized, the incorporation of a metal reaction accelerator is particularly desirable to assure complete cure of the composition throughout the permeated concrete. When the free radical initiator is an organic peroxide, the additional use of a metal reaction accelerator is desirable to provide a more rapid cure of the polymer than would be possible in the absence of the metal reaction accelerator. Typically, the metal reaction accelerator is present in the composition in amounts of about 0.0005 to 2 weight percent of metal based on total monomer weight.

Metal reaction accelerators include polyvalent metal salts of inorganic acids or aliphatic acids and oxides of the metals. Examples of such salts include the chloride, nitrate, borate, sulfate, acetate, acetyl acetonate, propionate, butyrate, pentanoate, octoate, hexoate and naphthenate salts. Additionally, the metal reaction accelerator may be the salt of such complex acids as resinic acid, tall oil fatty acids, linseed oil fatty acids, lauric acids, palmitic acid, myristic acid, stearic acid, oleic acid, linoleic acid, linolenic acid, behenic acid, cerotic acid, montanic acid and abietic acid. Examples of the polyvalent metal include calcium, copper II, zinc II, manganese II, manganese III, lead II, cobalt II, cobalt III, iron III, vanadium II, vanadium III and zirconium IV. Particularly preferred metal reaction accelerators are the salts of cobalt and vanadium.

When the monomer mixture is stored in the presence of a metal reaction accelerator, the composition may also contain a volatile reaction inhibitor to prevent premature polymerization of the monomers before application to the desired substrate. Because these inhibitors are volatile, they dissipate in the air upon application of the composition to the substrate and no longer inhibit the polymerization reaction. Preferred inhibitors include volatile oximes such as methylethyl ketone-oxime, methylbutyl ketone-oxime, 5-methyl-3-heptanone-oxime, cyclohexanone-oxime and butyraldehyde-oxime. Volatile reaction inhibitors are present in an effective amount, preferably in amounts of about 0.01 to 2% by weight based on total monomer weight.

The composition of the present invention is typically provided as a three-part mixture providing both classes of monomers in the indicated ratios in one container, the metal reaction accelerator in a second container, and the free radical initiator in the third container. The free radical initiator can never be combined with the metal reaction accelerator without the monomer present due to the violent reaction that would ensue. Alternatively, this composition may be provided as a two-part system. In such a system, the monomers are provided in one container, optionally together with a metal reaction accelerator and a volatile reaction inhibitor. The free radical reaction initiator is provided in a separate container and is mixed together with the monomer mixture at the site of application.

Amine accelerators may also be incorporated in the composition just before application to reduce cure time, especially when the composition is to be used in cold weather conditions. Examples of amine accelerators are aniline; N,N-dimethylaniline; N,N-diethylaniline; toluidine; N,N-dimethyl-p-toluidine; N-ethyl,N-hydroxyethyl-m-toluidine; 2,2'-(m-tolylimino)diethanol; N,N-di(-hydroxyethyl)toluidine and the like. These amine accelerators are present in an amount effective to reduce cure time, preferably about 0.01 to 2% by weight based on total monomer weight.

The composition of the present invention may additionally comprise minor amounts of additives, such as coloring agents, stabilizers, thickeners, rheological modifiers, preservatives or anticorrosive agents. Most preferably, any such additives do not contain particles that are larger than the average pore size on the surface to be coated, which would inhibit penetration of the composition into the substrate.

Waxes that may usefully be incorporated in the acrylate or methacrylate composition must be soluble in the acrylate or methacrylate monomer composition in the liquid state, that is before curing. The wax is defined to be soluble in the liquid monomer composition when the resulting mixture is a single phase, clear and free from gel particles or cloudiness. The wax must further be insoluble or incompatible in the acrylate or methacrylate composition after it has been cured. In other words, the wax must "bloom" to the surface of the composition as it cures.

Acrylate or methacrylate compositions as used in the present invention have been observed to first bulk cure, and then surface cure. While not being bound by theory, it is believed that the initial bulk cure of the acrylate or methacrylate composition forces the wax to the surface of the composition due to its incompatibility. As more and more of the wax collects at the surface, it is believed that the air/liquid interface is reduced, thereby excluding air from the surface and hastening progress of the curing reaction. Surprisingly, the wax does not form a boundary layer at the liquid/substrate interface that adversely affects the bond between the coating and the substrate.

To be useful in the present invention, the wax must have a specific solubility range such that they will be soluble in the initial composition and become insoluble as the composition cures. Thus, waxes that have a very broad solubility parameter, and therefore are soluble in most anything, do not accelerate the cure of the monomer composition. Such waxes include Chlorowax 40 or Carbowax 200 or 600. Similarly, materials that are generally insoluble in most any solvent are also not suitable for use as a cure accelerator according to the present invention because they are initially insoluble in the monomer composition, and thereby do not provide the desired benefit. Examples of such materials include Chlorowax 70, glycerin, Carbowax 1500 and 3400, and polypropylene wax.

Useful waxes for accelerating the cure of monomer compositions are initially soluble in the monomer composition, but are insoluble in the composition as it cures. Examples of such waxes include plasticized carnuba wax and macrocrystallized paraffin. Plasticized carnuba wax is a vegetable wax containing an organic solvent, such as an aromatic solvent, in an amount effective to soften the wax. Preferably, paraffin is a macrocrystalline mixture of normal straight chain hydrocarbons.

Preferably, the useful waxes have a solubility parameter of between 8.3 to 12 $(cal/cc)^{\frac{1}{2}}$ in poorly to moderately hydrogen bonded solvents. Solubility Parameter is determined according to the method taught in the Polymer Handbook, edited by Brandrup and Immergut, pp. IV-341 to 362.

It has further surprisingly been found that additional incorporation of minor amounts of at least one N,N-dialkyl aminoalkyl acrylate or methacrylate compound in conjunction with incorporation of wax as taught herein in acrylate and/or methacrylate coating compositions further shortens cure time. When this additional component is added, surface cure time may be reduced 25 to 33% as compared to the surface cure time observed in compositions incorporating wax alone. This shorter cure time is not observed in acrylate or methacrylate compositions that do not contain wax.

While not being bound by any theory, it is believed that the N,N-dialkyl aminoalkyl acrylate or methacrylate shortens bulk gel time, in turn forcing the wax to bloom to the surface even quicker than would otherwise occur. The operation of the wax component in shortening cure time is thereby enhanced.

The N,N-dialkyl aminoalkyl acrylates or methacrylates to be used as optional additives in conjunction with wax cure accelerators preferably contain 1-3 carbons in each alkyl chain portion of the additive. More preferably, these compounds are N,N-di($C_1$-$C_2$ alkyl)aminoethyl acrylate or methacrylate, wherein the alkyl groups may be the same or different. Yet more preferably, these additives are N,N-diethyl aminoethyl acrylate or methacrylate. These additives are present at at least about 0.5 percent by weight of the total composition, and more preferably between 1 and 3 percent of the total composition.

Wax may be provided by heating and mixing with the monomer composition at high shear, heating the entire composition after the wax has been incorporated, or dissolving the wax in solvent (such as mineral spirits) and mixing cold or at relatively low temperature (example, 38° C.) to provide a homogenous mixture.

The composition of the present invention is optimally mixed at the site of application, and applied to the surface using a brush or squeegee. When the composition is used on a traffic surface, sand may optionally be spread over the composition as it dries in order to provide additional traction to the surface.

When all components are mixed, the resulting coating composition possesses a number of unexpected and desirable properties that make it particularly well adapted to coating porous surfaces such as portland cement concrete. The composition has an initial viscosity of between about 5 and 15 centipoise at 25° C. This viscosity provides an excellent capability of penetrating hairline cracks in the concrete, providing a greater degree of strength and better sealing capabilities. This property is particularly important under high application temperature conditions where the length of time that the composition is workable is short due to quicker cure times. For example, it is estimated that a crack that is about 0.2 mm thick will be penetrated at least about 5 to 8 cm. Additionally, the resulting composition is sufficiently low in viscosity that it will soak into uncompromised concrete before cure to further consolidate the concrete material. Typically, a penetration of about 0.5 to 1.5 cm is observed in uncracked concrete. It was not expected that a sufficiently low viscosity to achieve these penetration results could be provided by such an acrylate mixture, because very low molecular weight acrylate monomers that would be mixed with the DCP(M)A would also tend to be highly volatile and would be lost to the atmosphere before curing.

Due to the excellent penetration capability of the compositions of this invention, the composition will at least partially impregnate the body of the porous material before curing. While not being bound by any theory, it is believed that the cured composition essentially entraps the porous material in a polymer matrix, thereby deeply anchoring the polymer within the treated structure.

The composition of the present invention preferably maintains an optimum penetration viscosity (between about 5 and 15 centipoise) for about 1-2 hours, but cures to a hardened coating within about six hours and most preferably about four hours at a temperature of about 25° C. ambient temperature. Even shorter cure times may be observed when the amount of flexible monomer component is relatively low. The composition of the present invention, therefore, provides an ideal system for coating bridge decks and other traffic areas where it is desirable to minimize interruption of traffic flow. Thus, this composition may optimally be applied satisfactorily between rush hours on a typical business day.

The present composition provides particular advantages over previous compositions because there is no need to provide an application of a second liquid to the substrate to be coated in order to accelerate cure of the coating composition by excluding surface to air contact. The ultimate coating does not exhibit a loss of bond strength of the coating to the substrate to be coated. The coating itself does not appear to have lesser tensile properties from the incorporation of wax.

An additional advantage provided by the present composition is that due to the faster cure times experienced in the present composition, less monomer is lost to the air and the odor level is low as compared to prior acrylate or methacrylate compositions.

The following examples are presented to further illustrate the invention, and are not intended to limit the scope of the invention in any way.

EXAMPLES

In order to test the cure acceleration efficacy of various material additives, monomer compositions suitable for coating portland cement concrete were prepared as follows:

Monomer Component A
80 parts of dicyclopentenyl methacrylate
20 parts of iso-octyl acrylate
Monomer Component B
100% dicyclopentenyl methacrylate
Monomer Component C
100% dicyclopentenyl oxyethyl methacrylate.

SELECTION OF WAXES

To Monomer Component A was added 1 part of a wax material, with stirring and, if necessary, heating to make a homogeneous solution. To the homogeneous solution was added 4 parts of cumene hydroperoxide (CHP) and 1 part of a 12% metal content cobalt naphthenate catalyst system (commercially available as Nap-All ® catalyst from Mooney Chemicals, Inc., Cleveland, Ohio) with mixing. Sixty grams of the thus initiated composition was immediately poured into a 17.78 cm × 35.6 cm aluminum pan and allowed to cure.

Time required to achieve tack-free surface cure is tested by periodically stroking the surface of a sample with a dry cotton swab. The surface is tack-free when no cotton fibers are pulled off from the swab and none of the monomer composition is visibly absorbed onto the swab.

Bulk gel time is the period of time required from the initial mixing of the reactants to the time at which the composition begins to exhibit substantially increased viscosity. The increased viscosity is evaluated visually by holding the sample container at at least a 45° angle and observing the flow characteristics of the composition. Visual evaluation is considered to be adequate because the compositions change viscosity from very low to very high in a comparatively short time period.

The time required for bulk gel time and tack-free surface cure is reported for each composition in Table I.

TABLE I

| Example | 1 | 2 | 3 | 4 | 5 | 6 (Control) |
|---|---|---|---|---|---|---|
| Monomer Component A | 100 | 100 | 100 | 100 | 100 | 100 |
| Paraffin[1] | 1 | — | — | — | — | — |
| Plasticized Carnuba Wax[2] | — | 1 | — | — | — | — |
| Chlorowax 40[3] | — | — | 1 | — | — | — |
| ML 445[4] | — | — | — | 1 | — | — |
| W 835[5] | — | — | — | — | 1 | — |
| Cumene hydroperoxide | 4 | 4 | 4 | 4 | 4 | 4 |
| Cobalt, 12% | 1 | 1 | 1 | 1 | 1 | 1 |
| Bulk gel time, hours | 3 | 3 | 3 | 3 | 3 | 3 |
| Tack-free surface cure, hours | 5 | 6 | >8 | >8 | >8 | >8 |
| Appearance |  |  |  |  |  |  |
| Solution | cloudy | cloudy | clear | cloudy | cloudy | clear |
| Cured surface | matt | matt | shiny | matt | matt | shiny |

[1]Commercially available from Eastman Kodak Corp., Rochester, NY.
[2]Johnson and Johnson Paste Wax.
[3]A chlorinated wax commercially available from Diamond Alkali Corp., Cleveland, OH.
[4]A microcrystalline wax commercially available from Witco Corp., Trainer, PA.
[5]A microcrystalline wax commercially available from Witco Corp., Trainer, PA.

The coating compositions containing microcrystalline waxes after cure had a matt finish, indicating that the waxes ultimately bloomed to the surface. While some acceleration of cure time may be effected by microcrystalline waxes, the observed cure time was not observed to be within the particularly desired time frame. This class of waxes therefore is not preferred.

DIFFERENT MONOMER COMPOSITIONS

Efficacy of the wax cure acceleration in various acrylate-methacrylate coating compositions was shown by comparing bulk gel and surface cure times of various monomer compositions with and without wax.

To each 100 parts of each of these monomer compositions was added 3 parts cumene hydroperoxide and 1 part 12% active cobalt naphthenate to initiate polymerization. The material was immediately poured into a 0.75 liter glass jar and a 10 × 15 cm aluminum pan, with bulk gel time and tack-free surface cure times observed as reported in Table II.

TABLE II

| Cure Times: at Room Temperature | Bulk Gel Time 60.0 g in glass jar (Min) | Bulk Gel Time 40.0 g in flat pan (Min) | Surface Cure 40.0 g in flat pan (Min) |
| --- | --- | --- | --- |
| Monomer Component B | 86 | 167 | 521 |
| Monomer Component B w/Paraffin, 1% | 106(+ 23%) | 179(+ 7%) | 254(− 51%) |
| Monomer Component A | 105 | 177 | 528 |
| Monomer Component A w/Paraffin, 1% | 116(+ 10%) | 173(− 2%) | 260(− 51%) |
| Monomer Component C | 34 | 93 | 356 |
| Monomer Component C w/Paraffin, 1% | 45(+ 32%) | 99(+ 6%) | 115(− 67%) |
| Average change | (+ 21%) | (+ 4%) | (− 57%) |

The addition of Paraffin wax to the monomers added about 21% to the bulk gel time, but decreased the overall complete cure time by about 57%. The composition of Monomer Component A seemed to be the least affected by the wax while compositions of Monomer Component C was the most affected.

EFFECT AT DIFFERENT TEMPERATURES

The surprising effect of accelerated cure by incorporation of wax, particularly at lower temperatures, is shown by comparing cure time of compositions with and without wax over a temperature range. As shown in Table IV below, comparative example 7 corresponds to Example 8. Similarly, comparative example 9 corresponds to Example 10. Examples 9 and 10 show examples where the cobalt naphthenate is mixed with the monomer component and the methyl ethyl ketoxime stabilizer so that the coating system as sold to the user is a two-part system.

Sixty grams of each of Examples 7–10 were poured into 10×15 cm aluminum pans and allowed to cure at 4°, 16°, 27°, 38°, and 49° C., one sample for each temperature level. Times required for bulk gel time and tack-free surface cure of the coating compositions are reported in Table IV.

TABLE III

| Example | 7 | 8 | 9 | 10 |
| --- | --- | --- | --- | --- |
| Monomer Component A | 100 | 100 | 100 | 100 |
| Paraffin Wax | 0 | 1 | 0 | 1 |
| Methyl Ethyl Ketoxime | 0 | 0 | 0.3 | 0.3 |
| Cumene Hydroperoxide | 3 | 3 | 3 | 3 |
| 12% Cobalt Naphthenate | 1 | 1 | 1 | 1 |

TABLE IV

| Example | | Bulk Gel Time (Min) | Surface Cure (Min) |
| --- | --- | --- | --- |
| 7 | 4° C. | 350 | 7020 |
| 7 | 16° C. | 202 | 1447 |
| 7 | 27° C. | 107 | 294 |
| 7 | 38° C. | 52 | 138 |
| 7 | 49° C. | 35 | 50 |
| 8 | 4° C. | 311 | 516 |
| 8 | 16° C. | 220 | 320 |
| 8 | 27° C. | 113 | 211 |
| 8 | 38° C. | 72 | 132 |
| 8 | 49° C. | 28 | 63 |
| 9 | 4° C. | 594 | 8460 |
| 9 | 16° C. | 266 | 2887 |
| 9 | 27° C. | 122 | 320 |
| 9 | 38° C. | 76 | 142 |
| 9 | 49° C. | 38 | 70 |
| 10 | 4° C. | 1080 | 1680 |
| 10 | 16° C. | 555 | 765 |
| 10 | 27° C. | 129 | 220 |
| 10 | 38° C. | 70 | 145 |
| 10 | 49° C. | 44 | 72 |

TABLE IV-continued

Turning now to the drawing, FIG. 1 is a graphic presentation of the data reported in Table IV. Curve A shows the cure times of samples kept at different temperatures for tack-free surface cure of Example 7. Curve B shows the surface cure times for Example 8. This figure graphically shows the surprisingly short surface cure times observed for compositions comprising wax at lower temperatures. Similarly, Curve C shows the surface cure time for Example 10, a two-part coating system. Because of the presence of methyl ethyl ketoxime to stabilize the monomer in the presence of cobalt naphthenate, this two-part system takes even longer to cure than the corresponding three-part system. Curve D shows a significant shortening of surface cure time by incorporation of wax.

EFFECT OF QUANTITY OF WAX

Compositions comprising different amounts of wax were prepared to determine effect of quantity of wax on cure time.

One hundred parts of Monomer Component A were mixed with the indicated amount of paraffin wax for three hours at 54° C. Three parts of cumene hydroperoxide and one part of cobalt naphthenate, 12% active, were then mixed in, and 60 grams of each example was poured into a 17.5×35 cm aluminum tray and allowed to cure at either 7° or 21° C. Tack-free surface cure times are reported in Table V.

TABLE V

| Example | 11 | 12 | 13 | 14 | 15 |
| --- | --- | --- | --- | --- | --- |
| Monomer Component A | 100 | 100 | 100 | 100 | 100 |
| Paraffin wax | 0 | 0.25 | 0.50 | 1.0 | 2.0[1] |
| Tack-free surface cure times, hrs. | | | | | |
| at 21° C. | 12 | 9 | 6 | 4 | 4 |
| at 7° C. | <80 | <7 | <7 | <7 | <7 |

[1]Wax usually appears at the top surface of the composition before initiation.

Wax amounts of between about 0.5 and 1.5 percent by weight would appear to provide the most efficient reduction in cure time.

EFFECT OF ADDITIONAL ADDITIVE

The advantage of further adding an N,N-dialkylamino alkyl acrylate or methacrylate compound was demonstrated by curing compositions comprising Monomer Component A with various additives. Examples as delineated in Table VI below were initiated by mixing 100 parts of the monomer component with 4 parts of cumeme hydroperoxide and 1 part of 12% cobalt naphthenate. Fifty grams of the initiated composition were poured into 17.5×35 cm aluminum trays and allowed to cure at the temperatures indicated.

TABLE VI

| Example | Gel/Cure Time (hours) | | | | | |
|---|---|---|---|---|---|---|
| | 38° C. | | 21° C. | | 7° C. | |
| | bulk | surface | bulk | surface | bulk | surface |
| 16 Monomer Comp. A | 0.75 | 1.5 | 3 | 4-10 | 6-7 | 60 |
| 17 Monomer Comp. A + 1% plasticized Carnuba wax | 1 | 2.0 | 3 | 6-7 | 5 | 10 |
| 18 Monomer Comp. A + 1% plasticized Carnuba wax + 2% N,N-diethyl-amino ethyl methacrylate | 0.5 | 1.25 | 1.5 | 4 | 3 | 7 |
| 19 Monomer Comp. A + 2% N,N-diethyl-amino ethyl methacrylate | 0.5 | 1.25 | 1.5 | 7-9 | 3 | 60 |

Substantial reduction in tack-free surface cure time, particularly in colder conditions, is observed for Example 18, which contains the N,N-dialkyl aminoalkyl methacrylate. This reduction in surface cure times is not observed for comparative example 19, which does not contain wax.

I claim:

1. An acrylate or methacrylate composition for coating porous surfaces, wherein said composition comprises
   a) 90-99.9% monomers selected from the group consisting of acrylate monomers, methacrylate monomers, and combinations thereof, and
   b) 0.1 to 5 percent by weight wax,
wherein said wax is soluble in said monomers when said monomers are in a liquid state, and is incompatible with a cured coating formed from the polymerization of said monomers.

2. The composition of claim 1, wherein said monomers have a molecular weight of greater than 200 g/mole.

3. The composition of claim 1, comprising dicyclopentenyl acrylate or dicyclopentenyl methacrylate.

4. The composition of claim 1, comprising isobornyl acrylate or isobornyl methacrylate.

5. The composition of claim 2, further comprising $C_5$ to $C_8$ alkyl esters of acrylic or methacrylic acid.

6. The composition of claim 1, wherein said wax is between about 0.5 and 1.5 percent of the total composition.

7. The composition of claim 1, wherein said wax has a solubility parameter of between about 8.3 and 12 $(cal/cc)^{\frac{1}{2}}$ in poorly to moderately hydrogen bonded solvents.

8. The composition of claim 1, wherein said wax is a plasticized carnuba wax.

9. The composition of claim 1, wherein said wax is a macrocrystalline paraffinic wax that is a mixture of normal straight chain hydrocarbons.

10. The composition of claim 1, further comprising a metal reaction accelerator and a volatile reaction inhibitor.

11. The composition of claim 1, further comprising at least about 0.5 percent by weight of at least one compound selected from the group consisting of N,N-dialkylamino acrylates and N,N-dialkylamino alkyl methacrylates.

12. The composition of claim 11, wherein said compound is selected from N,N-dialkylamino ethyl methacrylate and N,N-dialkylamino ethyl acrylate, wherein said alkyl groups are selected from methyl and ethyl.

13. The composition of claim 15, further comprising
   d) between about 1 and 3% of at least one compound selected from N,N-dialkylamino ethyl methacrylate and N,N-dialkylamino ethyl acrylate, wherein said alkyl groups are selected from methyl and ethyl.

14. The composition of claim 15, further comprising
   e) a metal reaction accelerator in the amount of 0.0005 to 2 weight percent of metal based on total monomer weight, wherein said metal reaction accelerator is selected from the group consisting of cobalt and vandium salts; and
   f) 0.01 to 2% of a volatile reaction inhibitor selected from the group consisting of methylethyl ketone-oxime, methylbutyl ketone-oxime, 5-methyl-3-heptanone-oxime, cyclohexanone-oxime and butyraldehyde oxime.

15. The composition of claim 1, wherein component a) comprises 45-95 percent by weight based on total monomer weight of monomers selected from the group consisting of acrylate monomers, methacrylate monomers, and combinations thereof, having a molecular weight greater than 200 g/mole.

16. The composition of claim 1, wherein component a) comprises 5-50 percent by weight based on total monomer weight of monomers selected from the group consisting of $C_5$ to $C_8$ alkyl esters of acrylic or methacrylic acid.

* * * * *